(12) United States Patent
Jerwick

(10) Patent No.: US 9,862,374 B2
(45) Date of Patent: Jan. 9, 2018

(54) SERIES HYBRID TRANSMISSION AND GEAR-SHIFTING METHOD FOR A SERIES HYBRID TRANSMISSION

(71) Applicant: Mack Trucks, Inc., Greensboro, NC (US)

(72) Inventor: John Jerwick, Hagerstown, MD (US)

(73) Assignee: Mack Trucks, Inc., Greesboro, NC (US)

( * ) Notice: Subject to any disclaimer, the term of this patent is extended or adjusted under 35 U.S.C. 154(b) by 0 days.

(21) Appl. No.: 14/441,530

(22) PCT Filed: Nov. 29, 2012

(86) PCT No.: PCT/US2012/067008
§ 371 (c)(1),
(2) Date: May 8, 2015

(87) PCT Pub. No.: WO2014/084827
PCT Pub. Date: Jun. 5, 2014

(65) Prior Publication Data
US 2015/0274152 A1 Oct. 1, 2015

(51) Int. Cl.
*F16H 37/06* (2006.01)
*B60W 10/08* (2006.01)
(Continued)

(52) U.S. Cl.
CPC ............. *B60W 20/108* (2013.01); *B60K 6/46* (2013.01); *B60K 6/547* (2013.01); *B60W 10/08* (2013.01);
(Continued)

(58) Field of Classification Search
CPC .... F16H 37/065; F16H 37/0826; F16H 37/08; F16H 61/0403; F16H 2003/0936;
(Continued)

(56) References Cited

U.S. PATENT DOCUMENTS 3,377,876 A  4/1968  Finke et al.
6,328,122 B1  12/2001  Yamada et al.
(Continued)

FOREIGN PATENT DOCUMENTS

EP  1270301 A2  1/2003
EP  1283382 A2  2/2003
(Continued)

OTHER PUBLICATIONS

Extended European Search Report dated Jul. 7, 2016 for corresponding European application 12889179.3.
(Continued)

*Primary Examiner* — Derek D Knight
*Assistant Examiner* — David R Morris
(74) *Attorney, Agent, or Firm* — WRB-IP LLP

(57) ABSTRACT

A series hybrid transmission includes a first motor device for driving a first shaft, a second motor device for driving a second shaft. Drive gears on the first and second shafts can be simultaneously engaged in the same or different gears and torque from the two motor devices can he multiplied. When shifting up or down, the drive gear on one of the shafts can be disengaged while the drive gear on the other one of the shafts remains engaged to avoid interruption in application of torque.

24 Claims, 11 Drawing Sheets

(51) Int. Cl.
*F16H 61/04* (2006.01)
*B60W 20/00* (2016.01)
*B60K 6/46* (2007.10)
*B60K 6/547* (2007.10)
*B60W 10/113* (2012.01)
*B60W 30/19* (2012.01)
*B60W 20/15* (2016.01)

(52) U.S. Cl.
CPC .......... *B60W 10/113* (2013.01); *B60W 20/15* (2016.01); *B60W 30/19* (2013.01); *F16H 37/065* (2013.01); *F16H 61/0403* (2013.01); *F16H 2061/0422* (2013.01); *Y02T 10/6217* (2013.01); *Y10S 903/93* (2013.01); *Y10T 477/23* (2015.01)

(58) Field of Classification Search
CPC ..... F16H 2003/0818; F16H 2003/0815; F16H 2003/0826; F16H 2200/0056; F16H 2200/0065; F16H 2200/2041; F16H 2200/2046; B60K 6/46; B60K 6/547
See application file for complete search history.

(56) References Cited

U.S. PATENT DOCUMENTS

| | | | | |
|---|---|---|---|---|
| 6,811,508 | B2* | 11/2004 | Tumback | B60K 6/445 475/5 |
| 7,150,698 | B2* | 12/2006 | Sakamoto | B60W 30/1819 180/65.25 |
| 7,226,379 | B2* | 6/2007 | Ibamoto | B60K 6/36 180/65.25 |
| 7,803,085 | B2* | 9/2010 | Himmelmann | B60K 7/0007 180/371 |
| 8,429,992 | B2* | 4/2013 | Braford | F16H 3/006 74/331 |
| 2005/0082098 | A1 | 4/2005 | Ito et al. | |
| 2009/0019967 | A1 | 1/2009 | Himmelmann | |
| 2010/0023230 | A1* | 1/2010 | Holmes | B60K 6/36 701/51 |
| 2010/0311540 | A1 | 12/2010 | Hellenbroich | |
| 2011/0111910 | A1* | 5/2011 | Ideshio | B60K 6/36 475/5 |
| 2011/0290072 | A1 | 12/2011 | Xie et al. | |
| 2013/0345018 | A1* | 12/2013 | Kaltenbach | B60K 6/48 477/5 |
| 2014/0000412 | A1* | 1/2014 | Kaltenbach | B60K 6/387 74/661 |

FOREIGN PATENT DOCUMENTS

| | | |
|---|---|---|
| EP | 1541895 A2 | 6/2005 |
| EP | 2450597 A1 | 5/2012 |
| JP | 2003061205 A | 2/2003 |
| JP | 20040150450 A | 5/2004 |
| JP | 2004210116 A | 7/2004 |
| JP | 2010076761 A | 4/2010 |
| JP | 2011033077 A | 2/2011 |

OTHER PUBLICATIONS

International Search Report (dated Feb. 20, 2013) for corresponding International App. PCT/US2012/067008.
International Preliminary Report on Patentability (dated Jan. 22, 2015) for corresponding International App. PCT/US2012/067008.
1st Japan Office Action dated Jun. 14, 2016 for corresponding Japan application No. 2015-545014 Translated.

* cited by examiner

SERIES HYBRID TRANSMISSION AND GEAR-SHIFTING METHOD FOR A SERIES HYBRID TRANSMISSION

BACKGROUND AND SUMMARY

The present invention relates generally to series hybrid transmission and to gear-shifting methods for series hybrid transmissions.

Typical truck transmissions have between six and twelve gear ratios, and use an idler gear to drive the truck in a single reverse gear. Truck engines ordinarily operate at speeds of about 2100 rpm.

Series hybrid transmissions connect an engine to a generator which, in turn, provides power to an electric motor that can drive a shaft of a transmission. The motors can often operate at much higher speeds than the engine, such as around 4500 rpm. Power that is not used by the motor can be stored in a storage device such as a battery. The transmission will often also be arranged to provide for regenerative braking.

In a typical series hybrid transmission, a single motor drives a shaft with a plurality of drive gears that are rotatably but not axially movably mounted on and the shaft and that are individually be engaged by a clutch that is non-rotatably but axially movably mounted on the shaft. To shift between gears, a clutch engaging one drive gear must first disengage before a clutch for engaging a higher or lower drive gear can engage, which interrupts torque transmission during shifting. This can be particularly disadvantageous when an increased load is imposed, such as when changing from traveling along a flat road to traveling uphill, and it is necessary to downshift to a lower gear. Additionally, the downshift will ordinarily result in a loss of vehicle speed.

It is desirable to provide a transmission that provides a multi-speed reverse. It is desirable that such a transmission be of minimal complexity. It is further desirable to reduce, minimize, or eliminate torque interruption during shifts.

According to an aspect of the present invention, a series hybrid transmission comprises a first motor device for driving a first shaft, a second motor device for driving a second shaft, a first drive gear rotatably but not axially movably mounted on and the first shaft, a second drive gear rotatably but not axially movably mounted on the second shaft, a first clutch non-rotatably but axially movably mounted on the first shaft, the first clutch being movable to a first position in which it engages with the first drive gear to cause the first drive gear to rotate with the first shaft and to a second position in which it disengages with the first drive gear, a second clutch non-rotatably but axially movably mounted on the second shaft, the second clutch being movable to a first position in which it engages with the second drive gear to cause the second drive gear to rotate with the second shaft and to a second position in which it disengages with the second drive gear, an output shaft comprising a first driven gear non-rotatably mounted on the output shaft and in engagement with the first drive gear and a second driven gear non-rotatably mounted on the output shaft and in engagement with the second drive gear, and a controller for controlling movement of the first clutch and the second clutch, while also controlling application of torque to the first shaft and the second shaft by the first motor device and the second motor device, respectively, from a first configuration in which the first clutch is engaged with the first drive gear and the second clutch is engaged with the second drive gear to a second configuration in which the first clutch is disengaged from the first drive gear and the second clutch is engaged with the second drive gear.

According to another aspect of the present invention, a gear-shifting method in a series hybrid transmission is provided, the series hybrid transmission comprising a first motor device for driving a first shaft, a second motor device for driving a second shaft, a first drive gear rotatably but not axially movably mounted on and the first shaft, a second drive gear rotatably but not axially movably mounted on the second shaft, a first clutch non-rotatably but axially movably mounted on the first shaft, the first clutch being movable to a first position in which it engages with the first drive gear to cause the first drive gear to rotate with the first shaft and to a second position in which it disengages with the first drive gear, a second clutch non-rotatably but axially movably mounted on the second shaft, the second clutch being movable to a first position in which it engages with the second drive gear to cause the second drive gear to rotate with the second shaft and to a second position in which it disengages with the second drive gear, and an output shaft comprising a first driven gear non-rotatably mounted on the output shaft and in engagement with the first drive gear and a second driven gear non-rotatably mounted on the output shaft and in engagement with the second drive gear. The method comprises controlling application of torque to the first shaft and the second shaft by the first motor device and the second motor device, respectively, and controlling movement of the first clutch and the second clutch, while also controlling application of torque to the first shaft and the second shaft by the first motor device and the second motor device, respectively, from a first configuration in which the first clutch is engaged with the first drive gear and the second clutch is engaged with the second drive gear to a second configuration in which the first clutch is disengaged from the first drive gear and the second clutch is engaged with the second drive gear.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
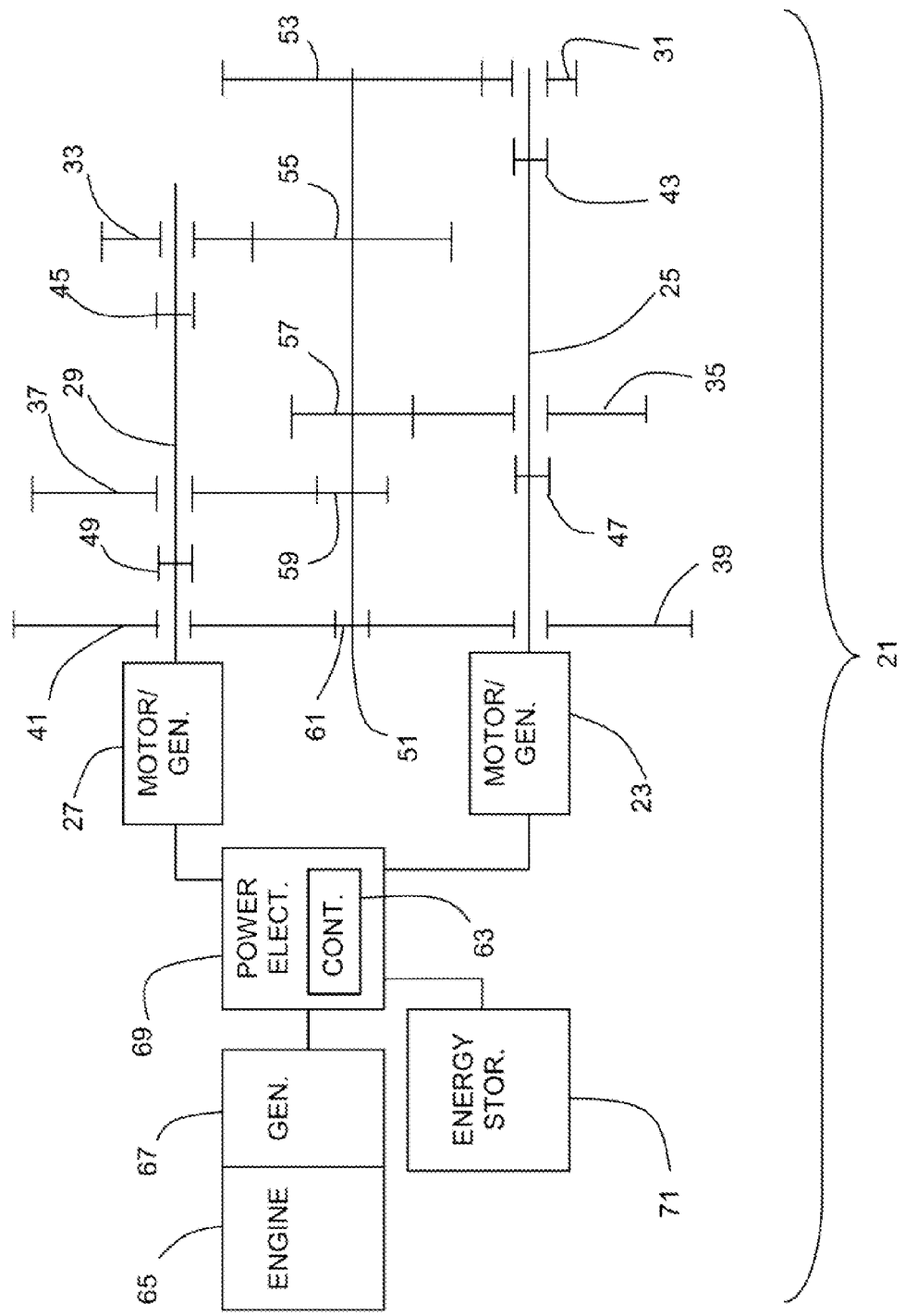
FIG. 1 schematically shows a transmission according to an aspect of the present invention in a disengaged configuration and FIGS. 2-9 show the transmission according to FIG. 1 in a variety of possible engaged configurations.

FIGS. 1-9 show an embodiment of a series hybrid transmission 21 according to an aspect of the present invention. The transmission 21 comprises a first motor device 23 for driving a first shaft 25 and a second motor device 27 for driving a second shaft 29. The first and second motor devices 23 and 27 are ordinarily electric motors or electric machines that are adapted to rotate clockwise or counterclockwise.

The transmission 21 includes a first drive gear 31 rotatably but not axially movably mounted on and the first shaft 25, a second drive gear 33 rotatably but not axially movably mounted on the second shaft 29. In the embodiment illustrated in FIGS. 1-9, a third drive gear 35 is rotatably but not axially movably mounted on the first shaft 25, a fourth drive gear 37 is rotatably but not axially movably mounted on the second shaft 29, a fifth drive gear 39 is rotatably but not axially movably mounted on the first shaft, and a second fifth drive gear 41 is rotatably but not axially movably mounted on the second shaft.

The transmission 21 further includes a first clutch 43 non-rotatably but axially movably mounted on the first shaft 25 and a second clutch 45 non-rotatably but axially movably mounted on the second shaft 29. The first clutch 43 is movable to a first position in which it engages with the first drive gear 31 (e.g., FIG. 2) to cause the first drive gear to rotate with the first shaft 25 and to a second position in which it disengages with the first drive gear (e.g., FIGS. 1 and 3-9). The second clutch 45 is movable to a first position in which it engages with the second drive gear 33 (e.g., FIGS. 2-4) to cause the second drive gear to rotate with the second shaft 29 and to a second position (e.g., FIGS. 1 and 5-9) in which it disengages with the second drive gear.

In the embodiment illustrated in FIGS. 1-9, a first shaft clutch 47 that is different than the first clutch 43, i.e., not the same clutch, is non-rotatably but axially movably mounted on the first shaft 25. The first shaft clutch 47 is movable to a first position in which it engages with the third drive gear 35 (e.g., FIGS. 4-6) to cause the third drive gear to rotate with the first shaft 25 and to a second position in which it disengages with the third drive gear (e.g., FIGS. 1-3 and 7). A second shaft clutch 49 is also shown that is different than the second clutch 45, and is non-rotatably but axially movably mounted on the second shaft 29. The second shaft clutch 49 is movable to a first position in which it engages with the fourth drive gear 37 (e.g., FIGS. 6-8) to cause the fourth drive gear to rotate with the second shaft 29 and to a second position in which it disengages with the fourth drive gear (e.g., FIGS. 1-5).

Figure 4:
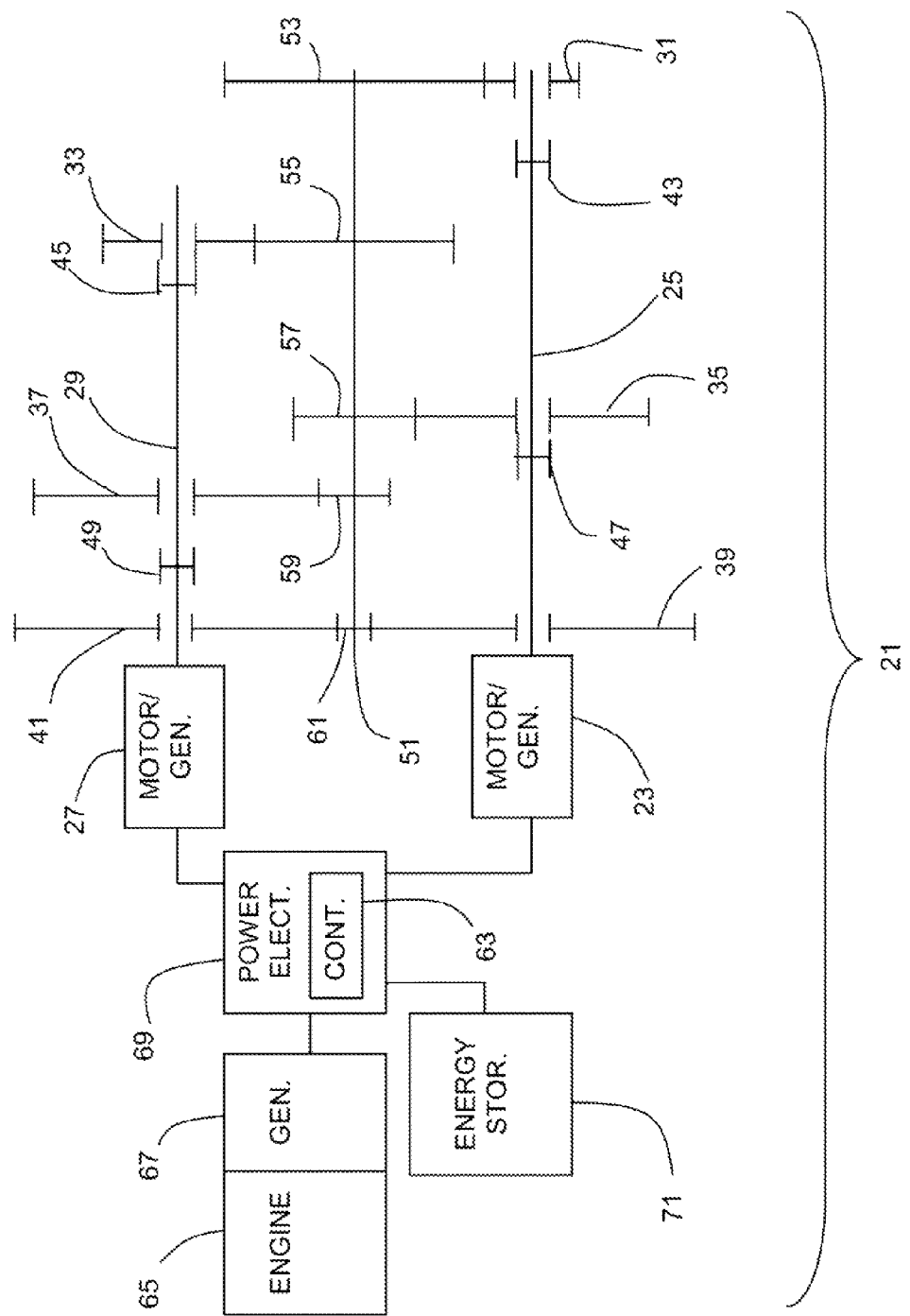
Figure 5:
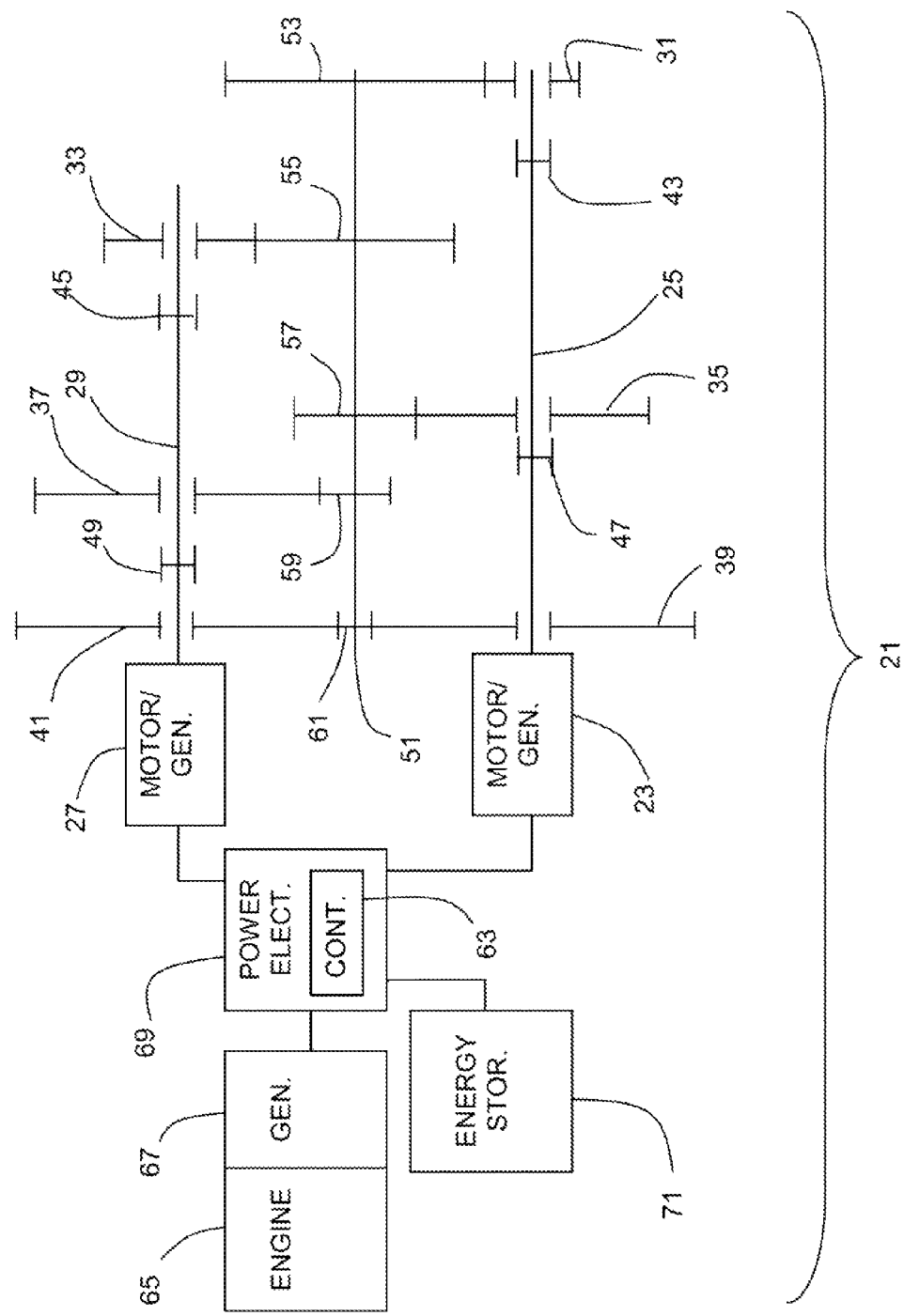
Figure 6:
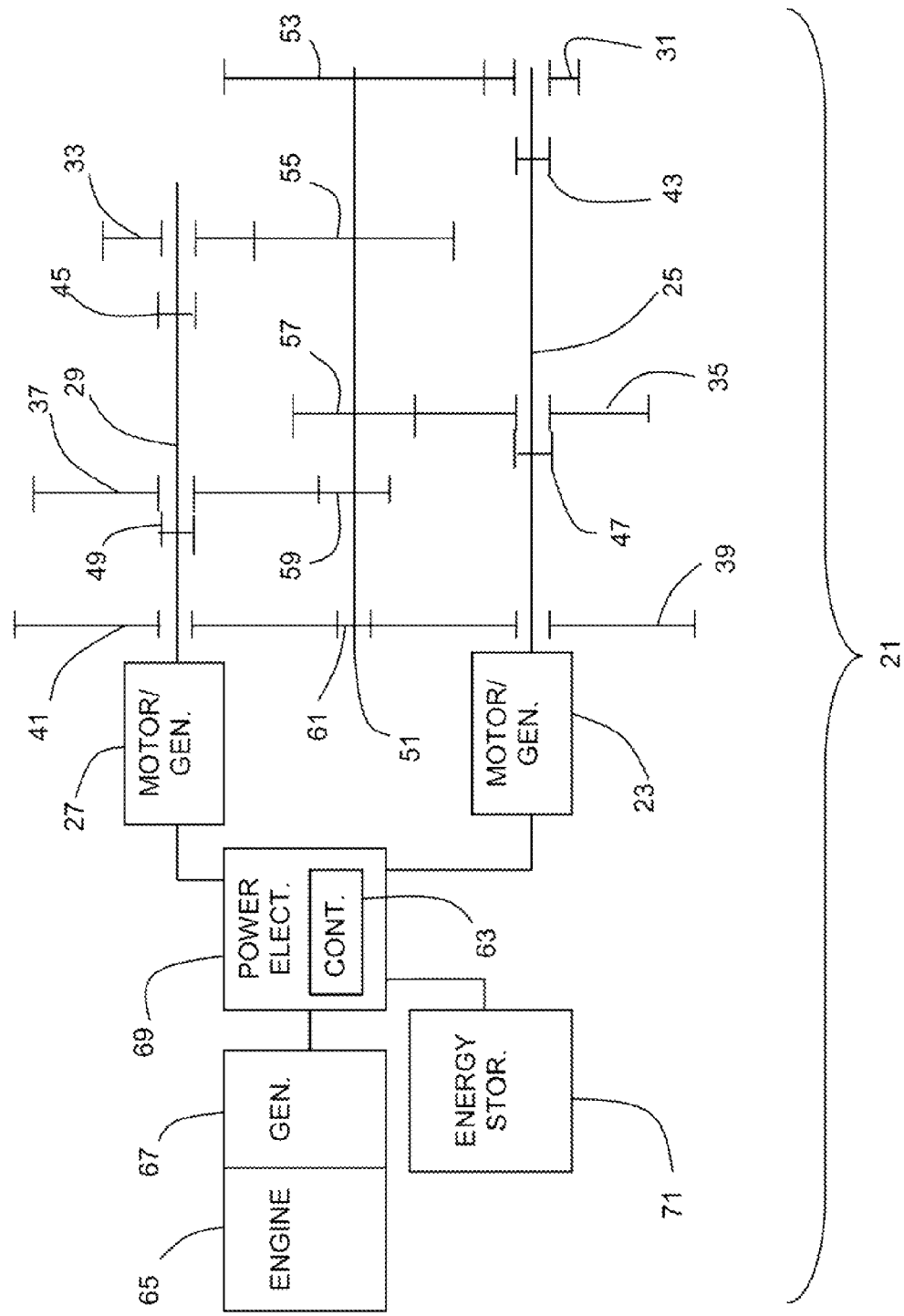
Figure 7:
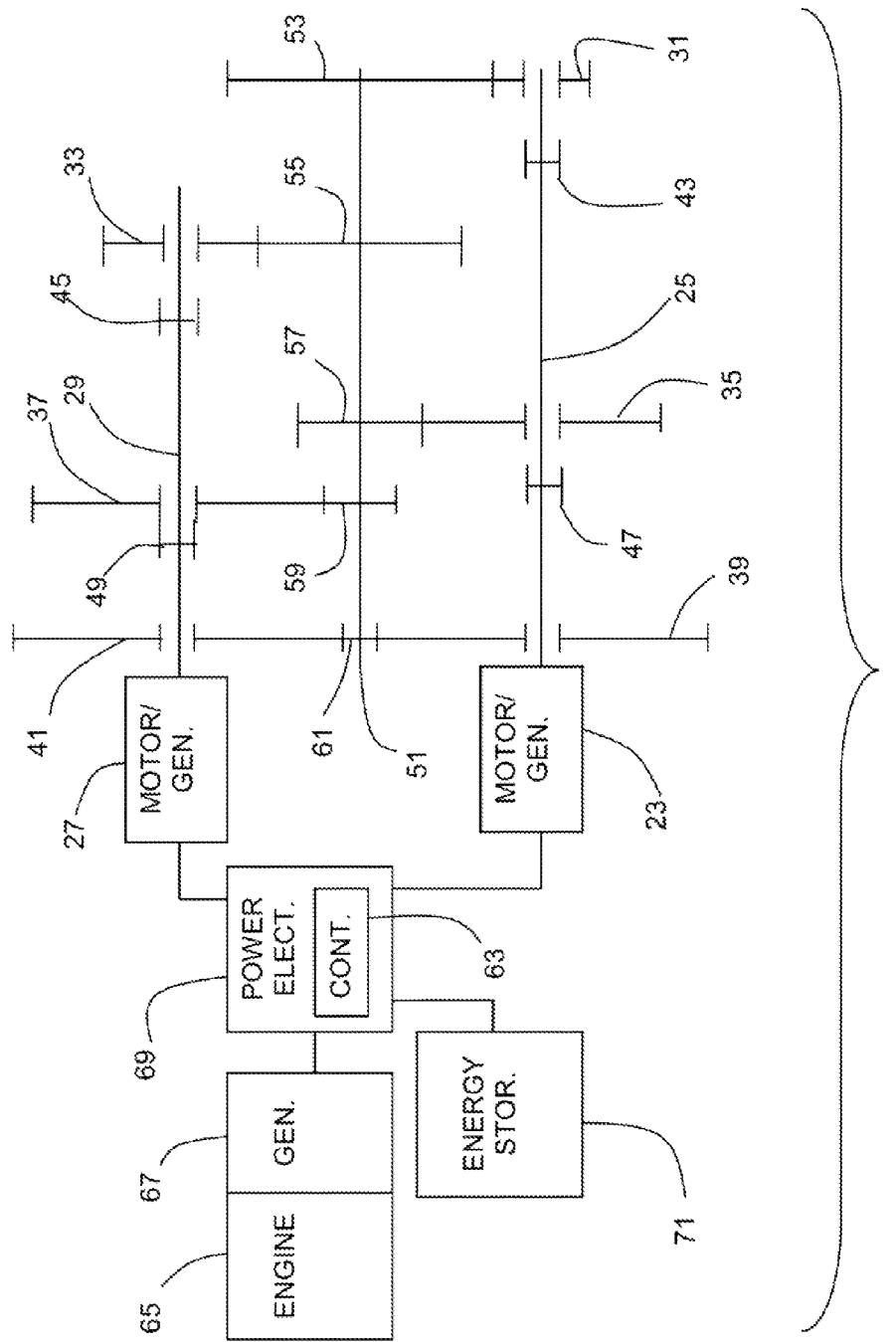
Figure 8:
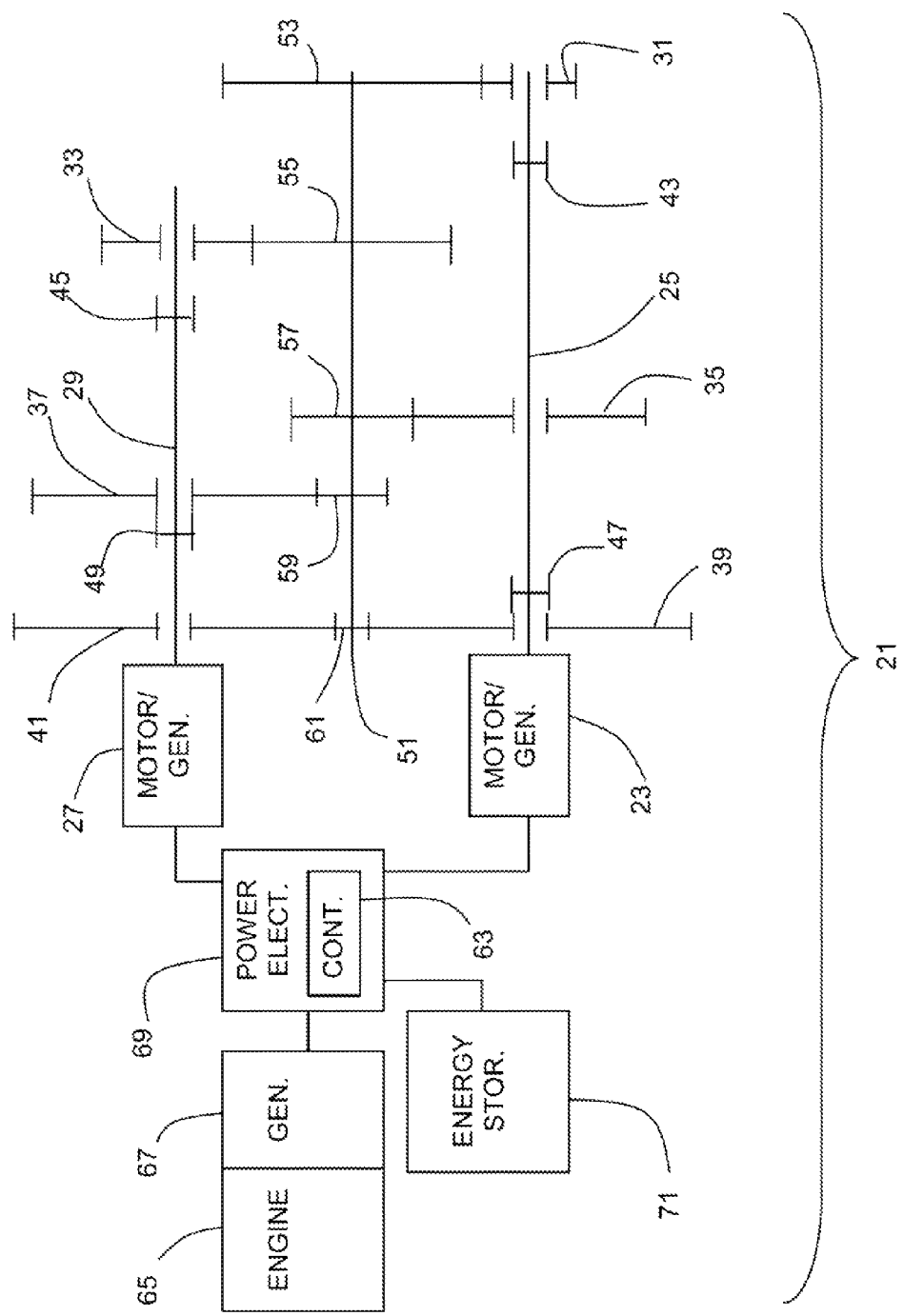
Figure 9:
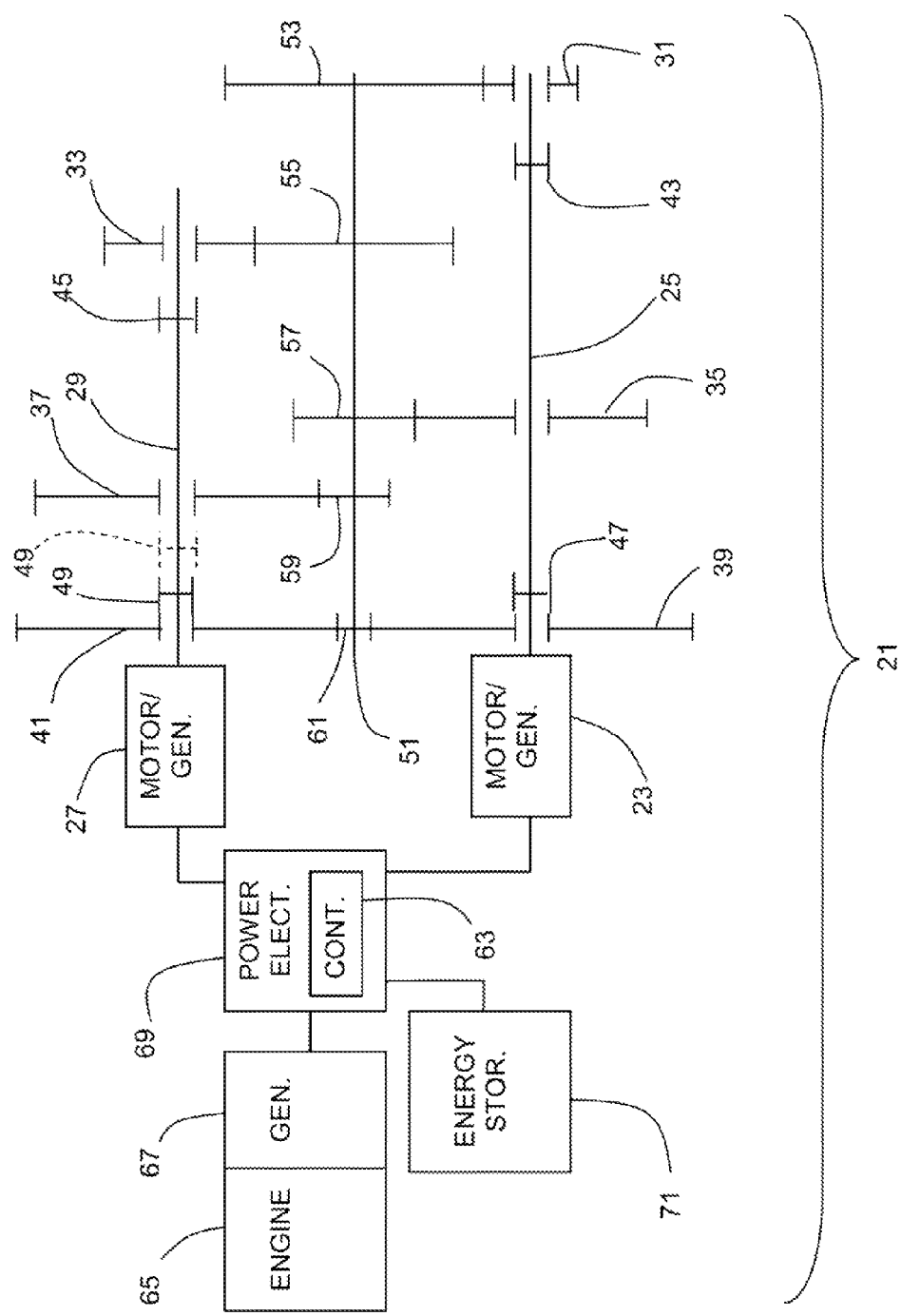

In the embodiment shown in FIGS. 1-9, the first shaft clutch 47 is movable to a third position in which it engages with the fifth drive gear 39 (FIGS. 8-9) to cause the fifth drive gear to rotate with the first shaft 25, to the second position (FIGS. 1-3 and 7) in which it disengages with both the third drive gear 35 and the fifth drive gear, and to the first position in which it engages with the third drive gear (FIGS. 4-6). Similarly, the second shaft clutch 49 is movable to a third position in which it engages with the second fifth drive gear (FIG. 9) to cause the second fifth drive gear 41 to rotate with the second shaft 29, to the second position in which it disengages with both the fourth drive gear 37 and the second fifth drive gear (FIGS. 1-5), and to the first position in which it engages with the fourth drive gear (FIGS. 6-8).

Instead of providing a separate first clutch 43 and a first shaft clutch 47, the same first clutch might be used to engage both the first drive gear 31 and the third drive gear 35. Likewise, instead of providing a separate second clutch 45 and a second shaft clutch 49, the same second clutch might be used to engage both the second drive gear 33 and the fourth drive gear 37. In other words, the first clutch can be provided so that it is movable to at least three positions: engaged with the first drive gear 31, engaged with the third drive gear 35, and disengaged from both the first drive gear and the third drive gear. Likewise, the second clutch can be provided so that it is movable to at least three positions: engaged with the second drive gear 33, engaged with the fourth drive gear 37, and disengaged from both the second drive gear and the fourth drive gear. All, some, or none of the clutches can be provided in this form.

Instead of providing a first shaft clutch 47 and a second shaft clutch 49 that can each engage with two different drive gears, separate clutches can be provided for engaging with respective drive gears. The particular transmission shown in FIGS. 1-9 is a merely presently preferred embodiment. The particular transmission shown in FIGS. 1-9 has five driven gears, however, transmissions according to aspects of the present invention are not limited to five driven gears and may include more driven gears or fewer.

The transmission 21 further comprises an output shaft 51 comprising a first driven gear 53 non-rotatably mounted on the output shaft and in engagement with the first drive gear 31 and a second driven gear 55 non-rotatably mounted on the output shaft and in engagement with the second drive gear 33. A third driven gear 57 can be non-rotatably mounted on the output shaft 51 and in engagement with the third drive gear 35; a fourth driven gear 59 can be non-rotatably mounted on the output shaft and in engagement with the fourth drive gear 37; and a fifth driven gear 61 can be non-rotatably mounted on the output shaft and in engagement with the fifth drive gear 39 and the second fifth drive gear 41.

A controller 63 such as an Engine Control Unit (ECU) is provided for, inter alia, controlling movement of the first clutch 43, the second clutch 45, the first shaft clutch 47, and the second shaft clutch 49, while also controlling application of torque to the first shaft 25 and the second shaft 29 by the first motor device 23 and the second motor device 27, during movement of the clutches from one configuration to another. The transmission 21 facilitates smooth transition from one gear to another. For example, the transmission 21 can be in a first configuration (FIG. 2) in which the first clutch 43 is engaged with the first drive gear 31 and the second clutch 45 is engaged with the second drive gear 33, which might be termed "first gear", and can then be moved, under control of the controller 63, to a second configuration (FIG. 3) in which the first clutch is disengaged from the first drive gear and the second clutch is engaged with the second drive gear, which might be termed "second gear". In this way, it is not necessary for there to be a period during which no torque is transmitted from the input shafts 25 or 29 to the output shaft 51 during shifting from one gear to another. Additionally, a smooth transition can be facilitated by controlling, usually via the controller 63, application of torque to the first shaft 25 and the second shaft 29 by the first motor device 23 and the second motor device 27, respectively, such that, when controlling movement of the clutches from one configuration to another configuration, torque applied to one or the other of the shafts can be reduced or increased as desirable or necessary. Usually, clutch collars such as might be used for the clutches in the transmission 21 are "torque bound" under load, meaning that the force to move the clutch collar is related to the static coefficient of friction of the collar to the gear and the normal contact force. By reducing torque, the normal contact force and, thus, the friction force is lowered enough to move the collar to a neutral position. When the collar again engages a gear, torque can be increased again.

Figure 2:
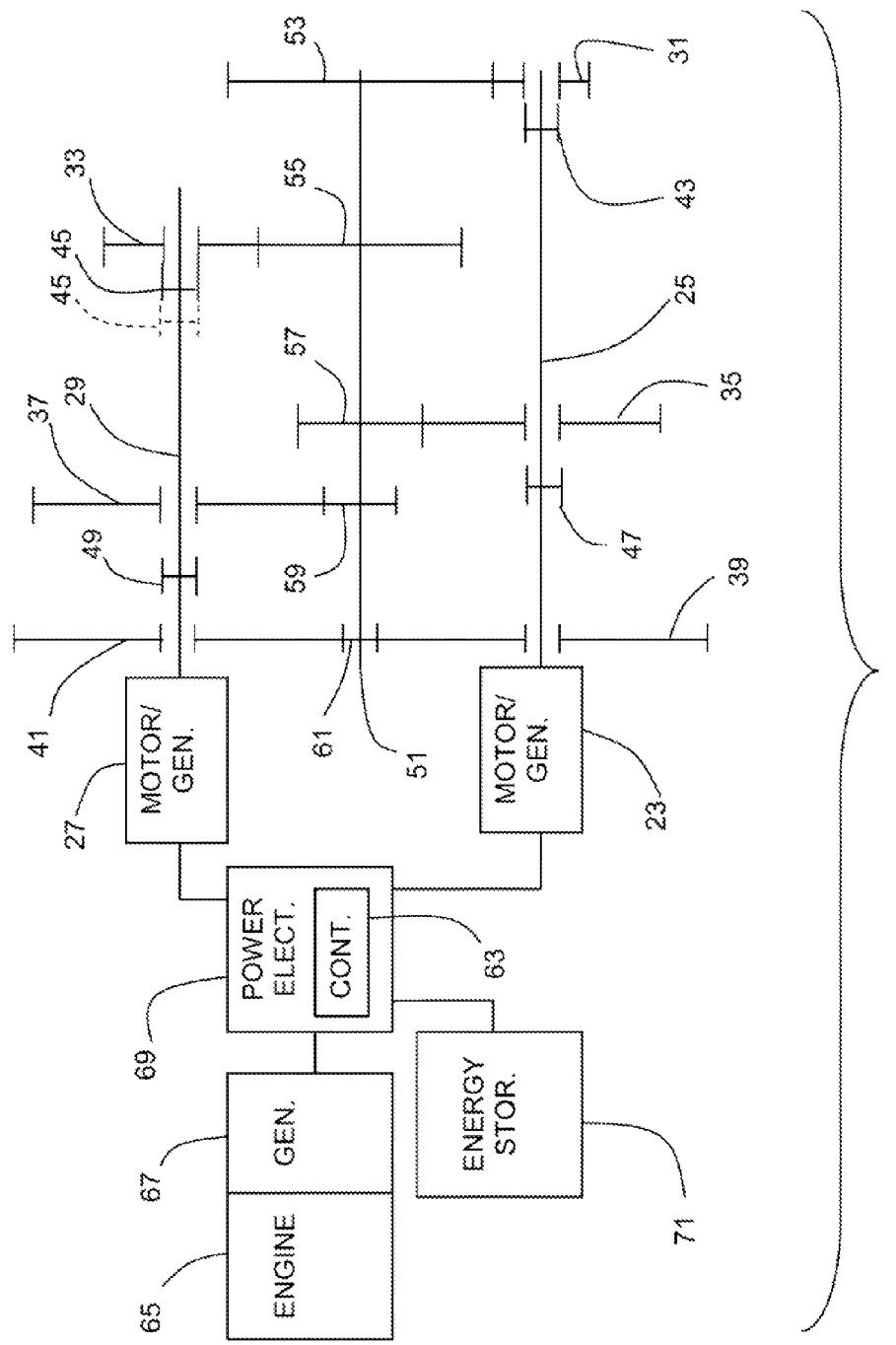
Figure 3:
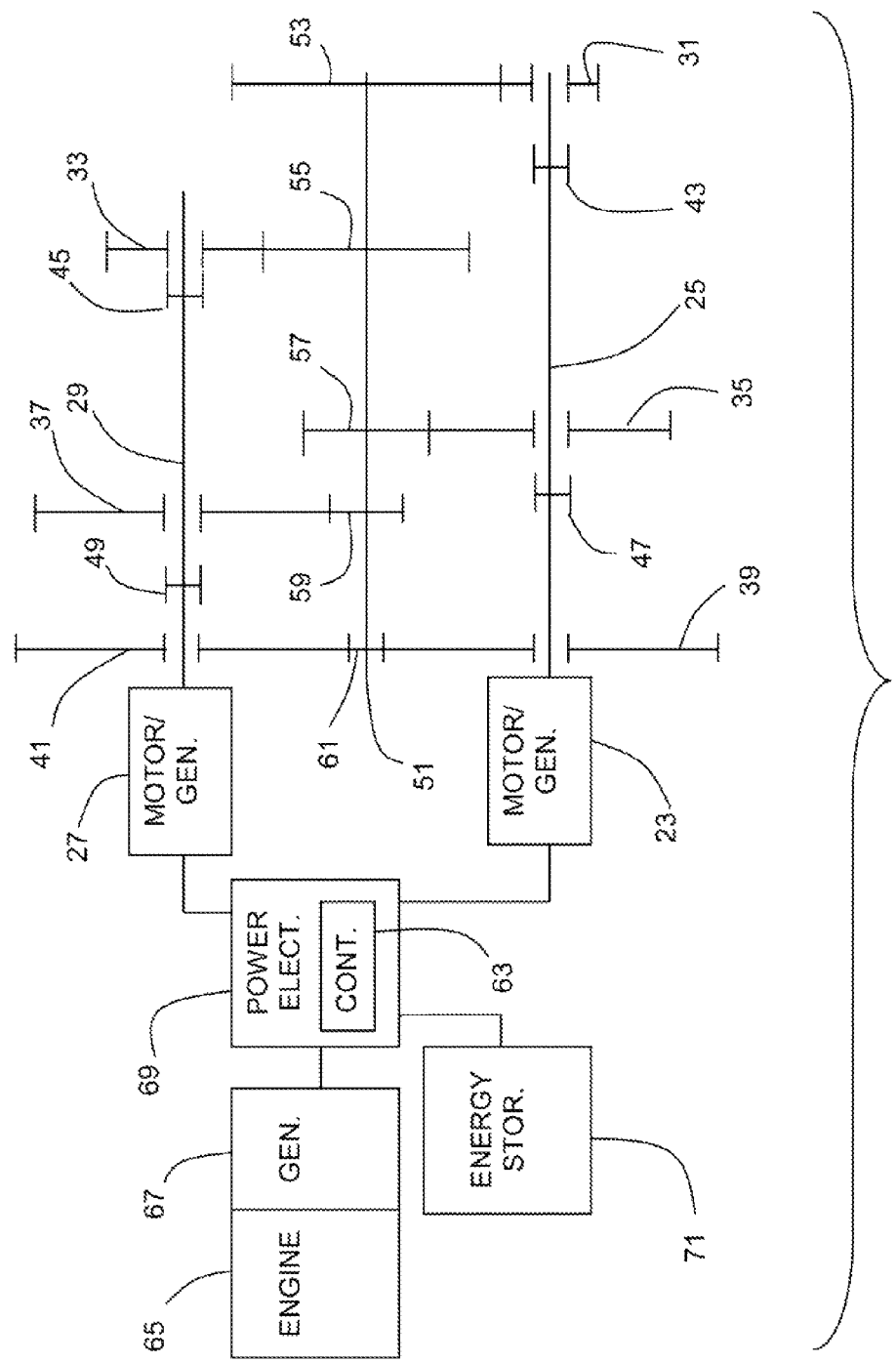

FIGS. 1-9 show the transmission 21 in a variety of configurations. FIG. 1 shows the transmission 21 in a disengaged configuration with none of the clutches engaged with any of the drive gears. FIG. 2 also shows a preliminary configuration in which the first clutch 43 can be moved to engage with the first drive gear 31 so the transmission is in first gear while the second clutch 45 (shown in phantom) remains disengaged from the second drive gear 33. It is not necessary that the transmission 21 be moved to the preliminary configuration prior to the first and second clutches 43 and 45 being moved to the first configuration shown in FIG. 2 (not in phantom) in which they engage with the first drive gear 31 and the second drive gear 33, respectively, i.e., the first and second clutches can be moved to engage with the first and second drive gears substantially simultaneously. It may, however, be desirable to first engage the first clutch 43 and the first drive gear 31 prior to engaging the second clutch 45 and the second drive gear 33 to facilitate a relatively smooth transition from completely disengaged to engaged in first gear. For example, after the first clutch 43 and first drive gear 31 are engaged, torque supplied from the first motor device 23 to the first shaft 25 might be gradually increased, then the second clutch 45 and the second drive gear 33 can be engaged and torque supplied from the second motor device 27 to the second shaft 29 can be gradually increased. It will be appreciated, however, that the transmission need not be launched with only first drive gear engaged, or only first and second drive gear engaged, and may be launched with any number of different gear combinations engaged, such as first and third (see, e.g., FIG. 11), first and fourth, second and fourth (FIG. 11), etc.

The controller 63 can control movement of the first shaft clutch 47, while also controlling application of torque to the first shaft 25 and the second shaft 29 by the first motor device 23 and the second motor device 27, respectively, from the second configuration (FIG. 3) in which the second clutch 45 is engaged with the second drive gear 33 and the first shaft clutch is disengaged with the third drive gear 35 to a third configuration (FIG. 4) in which the second clutch is engaged with the second drive gear and the first shaft clutch is engaged with the third drive gear. The controller 63 ordinarily also controls application of torque to the first shaft 25 and the second shaft 29 by the first motor device 23 and the second motor device 27, respectively, such that, when controlling movement of the first clutch 43 and the second clutch 45 from the first configuration (FIG. 2) to the second configuration (FIG. 3), torque applied to the first shaft is reduced. The controller 63 can also control application of torque to the first shaft 25 and the second shaft 29 by the first motor device 23 and the second motor device 27, respectively, such that, when controlling movement of the first shaft clutch 47 and the second clutch 45 from the second configuration (FIG. 3) to the third configuration (FIG. 4), torque applied to the first shaft 25 is increased. It is not ordinarily necessary to reduce torque applied to a drive shaft when disengaging a clutch from a gear, or to increase torque applied to a drive shaft when engaging a clutch and a gear, however, it is presently understood that doing so will ordinarily produce a smoother transition from one configuration to another.

The controller 63 can control movement of the second clutch 45, while also controlling application of torque to the first shaft 25 and the second shaft 29 by the first motor device 23 and the second motor device 27, respectively, from:

the third configuration (FIG. 4) in which the second clutch is engaged with the second drive gear 33 and the first shaft clutch 47 is engaged with the third drive gear 35 to a fourth configuration (FIG. 5) in which the second clutch is disengaged with the second drive gear and the first shaft clutch is engaged with the third drive gear. In the illustrated embodiment of the fourth configuration (FIG. 5), the second shaft clutch is disengaged with the fourth drive gear 37, as well.

the fourth configuration (FIG. 5) in which the first shaft clutch 47 is engaged with the third drive gear 35 and the second shaft clutch 49 is disengaged with the fourth drive gear 37 to a fifth configuration (FIG. 6) in which the first shaft clutch is engaged with the third drive gear and the second shaft clutch is engaged with the fourth drive gear.

the fifth configuration (FIG. 6) in which the first shaft clutch 47 is engaged with the third drive gear 35 and the second shaft clutch 49 is engaged with the fourth drive gear 37 to a sixth configuration (FIG. 7) in which the first shaft clutch is disengaged with the third drive gear and the second shaft clutch is engaged with the fourth drive gear.

the sixth configuration (FIG. 7) in which the first shaft clutch 47 is disengaged with the third drive gear 35 and the second shaft clutch 49 is engaged with the fourth drive gear 37 to a seventh configuration (FIG. 8) in which the first shaft clutch is engaged with the fifth drive gear 39 the second shaft clutch is engaged with the fourth drive gear 37.

the seventh configuration (FIG. 8) in which the first shaft clutch 47 is engaged with the fifth drive gear 39 and the second shaft clutch 49 is engaged with the fourth drive gear 37 to an eighth configuration (FIG. 9) in which the first shaft clutch is engaged with the fifth drive gear and the second shaft clutch is engaged with the second fifth drive gear 41.

from the seventh configuration (FIG. 8) in which the first shaft clutch 47 is engaged with the fifth drive gear 39 and the second shaft clutch 49 is engaged with the fourth drive gear 37 to an configuration (shown in phantom in FIG. 9) in which the first shaft clutch is engaged with the fifth drive gear and the second shaft clutch is disengaged from both the fourth drive gear and from the second fifth drive gear 41.

Figure 10:
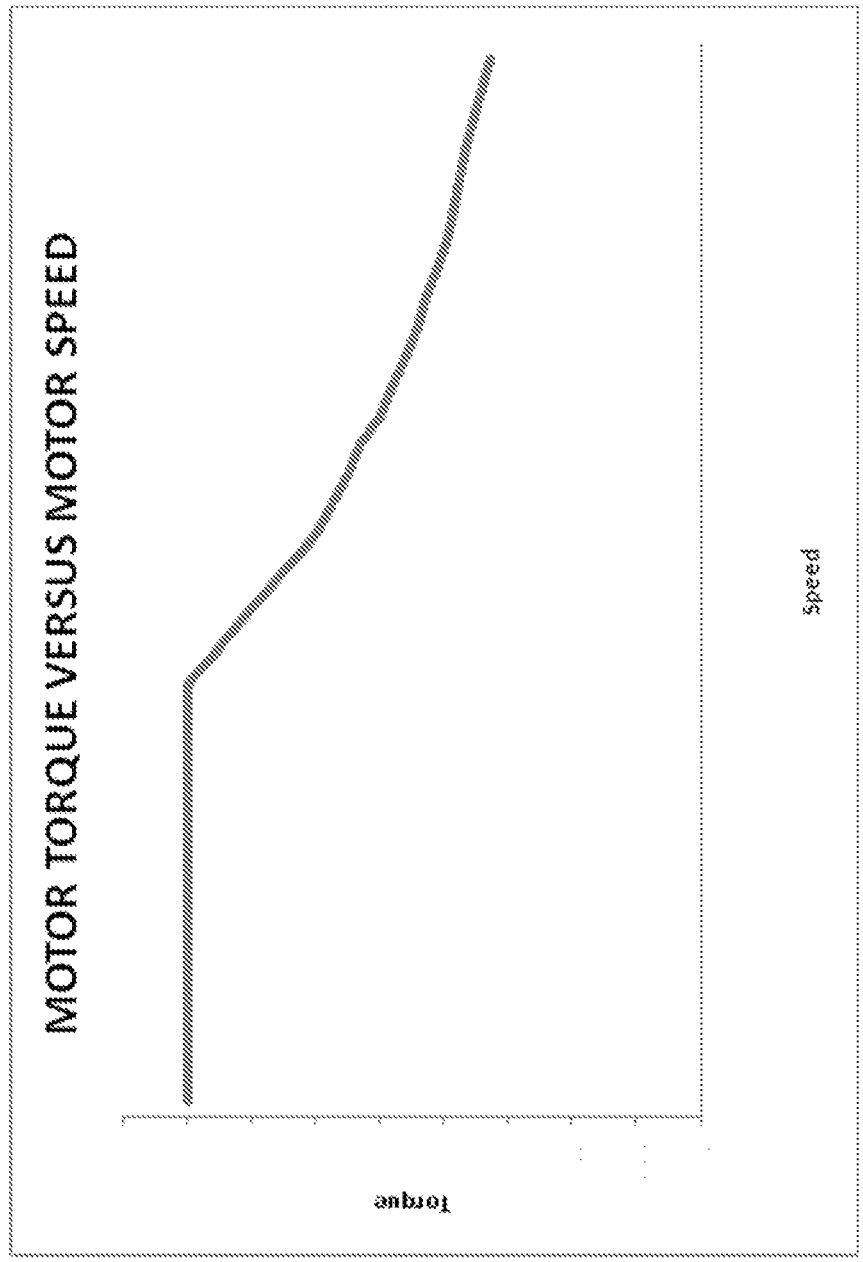
FIG. 10 shows graphs of motor torque and power output versus motor speed.

In the transmission 21 shown in FIGS. 1-9, torque is multiplied by having both motor devices 23 and 27 in fifth gear which can, in some circumstances, provide a greater mechanical advantage than when one of the motors is in fourth gear and the other is in fifth gear. This is illustrated in FIG. 10. The torque of motors follows a curve. As seen in FIG. 10, the curve typically looks like straight horizontal line from zero speed to a predetermined speed where it slopes down. Assume that the motor connected to second fifth drive gear 41 is in the constant torque region of the motor (horizontal line portion of the curve). Fifth gear has lower mechanical advantage than fourth and for the same output speed of the transmission second fifth drive gear 41 spins slower than the fourth drive gear 37. So, if the shaft 29 is connected to the fourth drive gear 37 is spinning faster than the constant motor torque region there is a speed (in the downward sloped motor torque region) where the motor torque times the fourth drive gear mechanical advantage is less than that of the motor in the constant torque region times the mechanical advantage of second fifth drive gear 41. Under this condition the output torque to the wheels is less when the fourth drive gear 37 is engaged by the second shaft clutch 49 than when the second fifth drive gear 41 is engaged by the second shaft clutch.

The transmission 21 facilitates maintaining speed control in a vehicle, such as when the vehicle is traveling uphill. For example, if the vehicle is in fifth gear, with both the fifth drive gear 39 and the second fifth drive gear 41 engaged by their respective first shaft clutch 47 and second shaft clutch 49, when the vehicle starts going uphill, the transmission can be shifted so that the second shaft clutch 49 disengages from the second fifth drive gear and engages the fourth drive gear 37, which can provide greater mechanical advantage.

Figure 11:
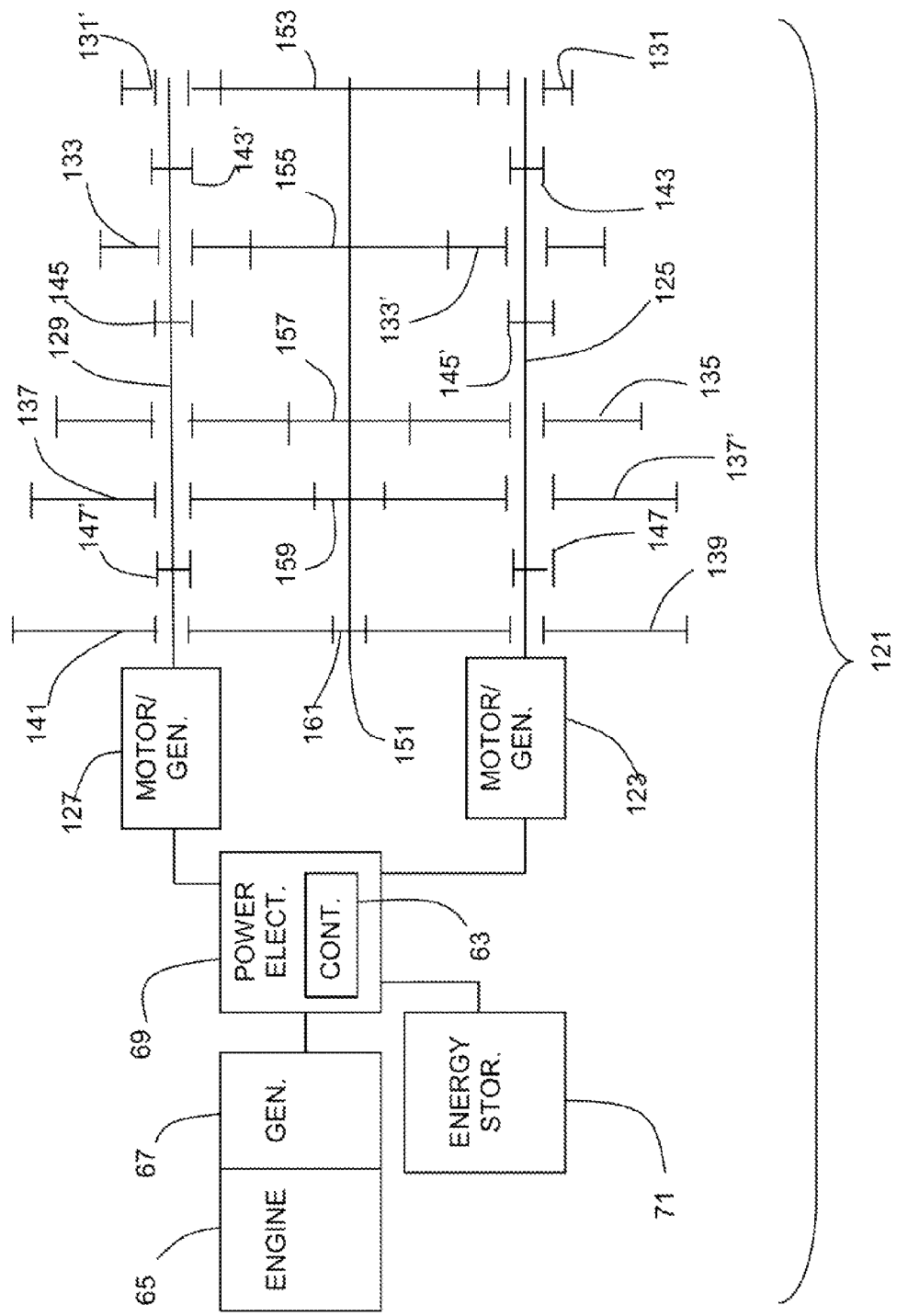
FIG. 11 schematically shows a transmission according to another aspect of the present invention.

FIG. 11 shows series hybrid transmission 121 with gear planes in addition to those shown in FIGS. 1-9. In the series hybrid transmission 121, a first motor device 123 drives a first shaft 125 and a second motor device 127 drives a second shaft 129. An output shaft 151 includes a first driven gear 153, a second driven gear 155, a third driven gear 157, a fourth driven gear 159, and a fifth driven gear 161. As with the transmission 21, the transmission 121 includes a first drive gear 131 rotatably but not axially movably mounted on and the first shaft 125, a second drive gear 133 rotatably but not axially movably mounted on the second shaft 129, a third drive gear 135 rotatably but not axially movably mounted on the first shaft, a fourth drive gear 137 rotatably but not axially movably mounted on the second shaft, a fifth drive gear 139 rotatably but not axially movably mounted on the first shaft, and a second fifth drive gear 141 rotatably but not axially movably mounted on the second shaft. In addition, the transmission 121 includes a second first drive gear 131' rotatably but not axially movably mounted on the second shaft 129, a second second drive gear 133' rotatably but not axially movably mounted on the first shaft 125, a second third drive gear 135' rotatably but not axially movably mounted on the second shaft, and a second fourth drive gear 137' rotatably but not axially movably mounted on the first shaft. First and second first clutches 143 and 143' are non-rotatably but axially movably mounted on the first shaft 25 the second shaft 29, respectively, for engaging with the first drive gear 131 and the second first drive gear 131', respectively. Second and second second clutches 145 and 145' are non-rotatably but axially movably mounted on the second shaft 29 and the first shaft 25, respectively, for engaging with the second drive gear 133 and the second second drive gear 133', respectively. The second and second second clutches 145 and 145' are also adapted to engage with the second third drive gear 135' and the third drive gear 135, respectively. Third and second third clutches 147 and 147' are non-rotatably but axially movably mounted on the first shaft 25 the second shaft 29, respectively, for engaging with the fourth drive gear 137 and the second fourth drive gear 137', respectively. The third and second third clutches 147 and 147' are also adapted to engage with the fifth drive gear 139 and the second fifth drive gear 141, respectively.

While FIG. 11 shows a transmission 121 adapted to be shifted into five different drive gears (plus neutral), it will be appreciated that additional or fewer drive and driven gears and clutches can be provided as desired or necessary. For example, drive and driven gears and clutches can be provided for only four, three, two, or one gear. Additionally, dual drive gears need not be provided for each gear. For example, a second third gear might be deleted, if desired or necessary. Providing additional gear planes as illustrated in FIG. 11 facilitates having both motor devices 123 and 127 driving the shafts 125 and 129 with each having engaged gears in the same gear at the same time, which can provide additional shifting options.

A controller 163 controls movement of the clutches and the second clutches in a manner similar to the manner in which the controller 63 controls movement of clutches, while also controlling application of torque to the first shaft 125 and the second shaft 129 by the first motor device 123 and the second motor device 127, respectively. For example, the control 163 controls movement of the first clutch 143 and the second first clutch 143', from a preliminary configuration in which the second first clutch is engaged with the second first drive gear 131' and the first clutch is engaged with the first drive gear 131 to a first configuration in which the first clutch is engaged with the first drive gear and the second clutch is engaged with the second drive gear 133. When shifting up or down, first one clutch on one shaft (say a first shaft) can disengage with an initial drive gear on that first shaft while a counterpart clutch on the other shaft (say, a second shaft) remains engaged with the same initial drive gear on the second shaft; then the clutch on the first shaft (or another clutch) can engage with a secondary drive gear on the first shaft, while the clutch on the second shaft remains engaged with the initial drive gear on the second shaft; then the clutch on the second shaft can disengage from the initial drive gear on the second shaft and that clutch (or another clutch) can engage with the same secondary drive gear on the second shaft. This or similar shifting processes can be repeated upward or downward through the gear options.

By providing a first motor device 23 (or 123) and a second motor device 27 (or 127) that are both adapted to turn either clockwise or counter-clockwise, the transmission 21 (or 121) can provide a plurality of forward or reverse gears without the need for, e.g., an idler gear. The transmission is particularly useful for propelling a vehicle in a forward or a reverse direction in a number of different gears.

It will be appreciated that the series hybrid transmission 21 also ordinarily includes an engine 65, a generator 67 connected to the engine and adapted to convert mechanical energy from the engine into electrical energy, power electronics 69, typically including the controller 63, for controlling transmission of electrical energy to the motor devices 23 and 27 and/or to an energy storage device 71, such as a battery. Substantially the same basic structures can be provided with the series hybrid transmission 121.

The transmission 21 (and the transmission 121) facilitate provision of a gear-shifting method that shall be described in connection with the transmission 21, except where otherwise noted. In the method, application of torque to the first shaft 25 and the second shaft 29 by the first motor device 23 and the second motor device 27, respectively, is controlled, usually by a device such as a controller 63 such as an ECU. At the same time, movement is controlled:

of the first clutch 43 and the second clutch 45 from the first configuration (FIG. 2) in which the first clutch is engaged with the first drive gear 31 and the second clutch is engaged with the second drive gear 33 to a second configuration (FIG. 3) in which the first clutch is disengaged from the first drive gear and the second clutch is engaged with the second drive gear.

of the first shaft clutch 47 from the second configuration in which the second clutch 45 is engaged with the second drive gear 33 and the first shaft clutch is disengaged with the third drive gear 35 to a third configuration (FIG. 4) in which the second clutch is engaged with the second drive gear and the first shaft clutch is engaged with the third drive gear.

of the second clutch 45 from the third configuration (FIG. 4) in which the second clutch engaged with the second drive gear 33 and the first shaft clutch 47 is engaged with the third drive gear 35 to a fourth configuration (FIG. 5) in which the second clutch is disengaged with the second drive gear and the first shaft clutch is engaged with the third drive gear.

of the second shaft clutch 49 from the fourth configuration (FIG. 5) in which the first shaft clutch is engaged with the third drive gear 35 and the second shaft clutch 49 is disengaged with the fourth drive gear 37 to a fifth configuration (FIG. 6) in which the first shaft clutch is engaged with the third drive gear and the second shaft clutch is engaged with the fourth drive gear.

of the first shaft clutch 47 from the fifth configuration (FIG. 6) in which the first shaft clutch is engaged with the third drive gear 35 and the second shaft clutch 49 is engaged with the fourth drive gear 37 to a sixth configuration (FIG. 7) in which the first shaft clutch is disengaged with the third drive gear and the second shaft clutch is engaged with the fourth drive gear.

of the first shaft clutch 47 from the sixth configuration (FIG. 7) in which the first shaft clutch is disengaged with the third drive gear 35 and the second shaft clutch 49 is engaged with the fourth drive gear 37 to a seventh configuration (FIG. 8) in which the first shaft clutch is engaged with the fifth drive gear 39 the second shaft clutch is engaged with the fourth drive gear 37. Between the sixth configuration and the seventh configuration, the first shaft clutch 47 will be disengaged from both the third drive gear 35 and the fifth drive gear 39.

of the second shaft clutch 49 from the seventh configuration (FIG. 8) in which the first shaft clutch 47 is engaged with the fifth drive gear 39 and the second shaft clutch is engaged with the fourth drive gear 37 to an eighth configuration (FIG. 9) in which the first shaft clutch is engaged with the fifth drive gear and the second shaft clutch is engaged with the second fifth drive gear 41.

of the second shaft clutch 49 from the seventh configuration (FIG. 8) in which the first shaft clutch 47 is engaged with the fifth drive gear 39 and the second shaft clutch is engaged with the fourth drive gear 37 to an configuration (shown in phantom in FIG. 9) in which the first shaft clutch is engaged with the fifth drive gear and the second shaft clutch is disengaged from both the fourth drive gear and from the second fifth drive gear 41.

The sequence from gear to gear in the transmission 121 is similar to that described above for the transmission 21, however, there can be a series of intermediate steps. For example, the transmission 121 might have a preliminary configuration in which the second first clutch 143' is engaged with the second first drive gear 131' and the first clutch 143 is engaged with the first drive gear 131, and then the transmission may be shifted to a first configuration in which the first clutch is engaged with the first drive gear and the second clutch is engaged with the second drive gear. Further, movement of the first clutch 143 and the second first clutch 143' can be controlled such that the first clutch and the second first clutch move from the preliminary configuration in which the second first clutch is engaged with the second first drive gear and the first clutch is engaged with the first drive gear to a second preliminary configuration in which the first clutch is engaged with the first drive gear and the second first clutch is disengaged from the second first drive gear.

Ordinarily, application of torque to the first shaft 25 and the second shaft 29 by the first motor device 23 and the second motor device 27, respectively, is controlled so that, when a clutch on a shaft disengages a drive gear, torque applied to the shaft is reduced and, when the clutch engages a drive gear, torque applied to the shaft is increased. However, torque can be applied in a variety of ways, or not applied at all, and the ways are not limited to the particular examples provided herein.

The method may be further enhanced by changing direction of turning of the first and second motor devices so that the output shaft 51 (or 151) changes direction of turning from clockwise to counter-clockwise. In this way, the transmission may be used to propel a vehicle in a forward or a reverse direction in a number of different gears.

The transmission and method according to aspects of the present invention facilitate provision and operation of a transmission having a multi-speed reverse that can be obtained by reversing motor direction electrically. This solution is of minimal complexity requires use of a minimal number of gear planes.

The transmission and method according to aspects of the present invention facilitate provision and operation of a transmission involving little or no torque interruption during shifts. Torque can be applied by one motor while the other motor is controlled for shifting and vice-a-versa. Additionally, full motor torque can be available in top gear. Torque can be multiplied in top gear, and the transmission can be operated with one motor in top gear and the other in a lower gear so that the torque of the two motors can be added. Good vehicle speed control can be provided due to substantial numbers of torque multiplying opportunities.

Relatively few gear planes are needed for vehicle operation in the transmission according to aspects of the invention due to the large possible operating speeds of motors versus engines.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A series hybrid transmission, comprising:
a first motor device for driving a first shaft;
a second motor device for driving a second shaft;
a first drive gear rotatably but not axially movably mounted on and the first shaft;
a second drive gear rotatably but not axially movably mounted on the second shaft;
a first clutch non-rotatably but axially movably mounted on the first shaft, the first clutch being movable to a first position in which it engages with the first drive gear to cause the first drive gear to rotate with the first shaft and to a second position in which it disengages with the first drive gear;
a second clutch non-rotatably but axially movably mounted on the second shaft, the second clutch being movable to a first position in which it engages with the second drive gear to cause the second drive gear to rotate with the second shaft and to a second position in which it disengages with the second drive gear;
an output shaft comprising a first driven gear non-rotatably mounted on the output shaft and in engagement with the first drive gear and a second driven gear non-rotatably mounted on the output shaft and in engagement with the second drive gear, wherein the first driven gear and the first drive gear have a different gear ratio than the second driven gear and the second drive gear; and
a controller for controlling movement of the first clutch and the second clutch, while also controlling application of torque to the first shaft and the second shaft by the first motor device and the second motor device, respectively, so that torque is applied to the first shaft and the second shaft by the first motor device and the second motor device, respectively, from a first configuration in which the first clutch is engaged with the first drive gear and the second clutch is engaged with the second drive gear to a second configuration in which the first clutch is disengaged from the first drive gear and the second clutch is engaged with the second drive gear.

2. The series hybrid transmission as set forth in claim 1, wherein the controller controls application of torque to the first shaft and the second shaft by the first motor device and the second motor device, respectively, such that, when controlling movement of the first clutch and the second clutch from the first configuration to the second configuration, torque applied to the first shaft is reduced.

3. The series hybrid transmission as set forth in claim 1, comprising:
   a third drive gear rotatably but not axially movably mounted on the first shaft;
   a first shaft clutch non-rotatably but axially movably mounted on the first shaft, the first shaft clutch being movable to a first position in which it engages with the third drive gear to cause the third drive gear to rotate with the first shaft and to a second position in which it disengages with the third drive gear; and
   a third driven gear non-rotatably mounted on the output shaft and in engagement with the third drive gear,
   wherein the controller controls movement of the first shaft clutch, while also controlling application of torque to the first shaft and the second shaft by the first motor device and the second motor device, respectively, from the second configuration in which the second clutch is engaged with the second drive gear and the first shaft clutch is disengaged with the third drive gear to a third configuration in which the second clutch is engaged with the second drive gear and the first shaft clutch is engaged with the third drive gear.

4. The series hybrid transmission as set forth in claim 3, wherein the controller controls application of torque to the first shaft and the second shaft by the first motor device and the second motor device, respectively, such that, when controlling movement of the first shaft clutch and the second clutch from the second configuration to the third configuration, torque applied to the first shaft is increased.

5. The series hybrid transmission as set forth in claim 3, wherein the first clutch and the first shaft clutch are different clutches.

6. The series hybrid transmission as set forth in claim 3, wherein the controller controls movement of the second clutch, while also controlling application of torque to the first shaft and the second shaft by the first motor device and the second motor device, respectively, from the third configuration in which the second clutch is engaged with the second drive gear and the first shaft clutch is engaged with the third drive gear to a fourth configuration in which the second clutch is disengaged with the second drive gear and the first shaft clutch is engaged with the third drive gear.

7. The series hybrid transmission as set forth in claim 6, comprising:
   a fourth drive gear rotatably but not axially movably mounted on the second shaft;
   a second shaft clutch non-rotatably but axially movably mounted on the second shaft, the second shaft clutch being movable to a first position in which it engages with the fourth drive gear to cause the fourth drive gear to rotate with the second shaft and to a second position in which it disengages with the fourth drive gear; and
   a fourth driven gear non-rotatably mounted on the output shaft and in engagement with the fourth drive gear,
   wherein the controller controls movement of the second shaft clutch, while also controlling application of torque to the first shaft and the second shaft by the first motor device and the second motor device, respectively, from the fourth configuration in which the first shaft clutch is engaged with the third drive gear and the second shaft clutch is disengaged with the fourth drive gear to a fifth configuration in which the first shaft clutch is engaged with the third drive gear and the second shaft clutch is engaged with the fourth drive gear.

8. The series hybrid transmission as set forth in claim 7, wherein the controller controls movement of the first shaft clutch, while also controlling application of torque to the first shaft and the second shaft by the first motor device and the second motor device, respectively, from the fifth configuration in which the first shaft clutch is engaged with the third drive gear and the second shaft clutch is engaged with the fourth drive gear to a sixth configuration in which the first shaft clutch is disengaged with the third drive gear and the second shaft clutch is engaged with the fourth drive gear.

9. The series hybrid transmission as set forth in claim 8, comprising:
   a fifth drive gear rotatably but not axially movably mounted on the first shaft;
   the first shaft clutch being movable to a third position in which it engages with the fifth drive gear to cause the fifth drive gear to rotate with the first shaft and to the second position in which it disengages with the fifth drive gear; and
   a fifth driven gear non-rotatably mounted on the output shaft and in engagement with the fifth drive gear,
   wherein the controller controls movement of the first shaft clutch, while also controlling application of torque to the first shaft and the second shaft by the first motor device and the second motor device, respectively, from the sixth configuration in which the first shaft clutch is disengaged with the third drive gear and the second shaft clutch is engaged with the fourth drive gear to a seventh configuration in which the first shaft clutch is engaged with the fifth drive gear the second shaft clutch is engaged with the fourth drive gear.

10. The series hybrid transmission as set forth in claim 9, comprising:
    a second fifth drive gear rotatably but not axially movably mounted on the second shaft;
    the second shaft clutch being movable to a third position in which it engages with the second fifth drive gear to cause the second fifth drive gear to rotate with the second shaft and to the second position in which it disengages with the second fifth drive gear;
    the fifth driven gear being non-rotatably mounted on the output shaft and in engagement with the second fifth drive gear,
    wherein the controller controls movement of the second shaft clutch, while also controlling application of torque to the first shaft and the second shaft by the first motor device and the second motor device, respectively, from the seventh configuration in which the first shaft clutch is engaged with the fifth drive gear and the second shaft clutch is engaged with the fourth drive gear to an eighth configuration in which the first shaft clutch is engaged with the fifth drive gear and the second shaft clutch is engaged with the second fifth drive gear.

11. The series hybrid transmission as set forth in claim 9, comprising:
  a second fifth drive gear rotatably but not axially movably mounted on the second shaft;
  the second shaft clutch being movable to a third position in which it engages with the second fifth drive gear to cause the second fifth drive gear to rotate with the second shaft and to the second position in which it disengages with the second fifth drive gear;
  the fifth driven gear being non-rotatably mounted on the output shaft and in engagement with the second fifth drive gear, and
  wherein the controller controls movement of the second shaft clutch, while also controlling application of torque to the first shaft and the second shaft by the first motor device and the second motor device, respectively, from the seventh configuration in which the first shaft clutch is engaged with the fifth drive gear and the second shaft clutch is engaged with the fourth drive gear to an eighth configuration in which the first shaft clutch is engaged with the fifth drive gear and the second shaft clutch is disengaged from the fourth drive gear and from the second fifth drive gear.

12. The series hybrid transmission as set forth in claim 7, wherein the second clutch and the second shaft clutch are different clutches.

13. The series hybrid transmission as set forth in claim 1, comprising:
  a second first drive gear rotatably but not axially movably mounted on the second shaft; and
  a second first clutch non-rotatably but axially movably mounted on the second shaft, the second first clutch being movable to a first position in which it engages with the second first drive gear to cause the second first drive gear to rotate with the second shaft and to a second position in which it disengages with the second first drive gear;
  wherein the controller control movement of the first clutch and the second first clutch, while also controlling application of torque to the first shaft and the second shaft by the first motor device and the second motor device, respectively, from a preliminary configuration in which the second first clutch is engaged with the second first drive gear and the first clutch is engaged with the first drive gear to the first configuration the first clutch is engaged with the first drive gear and the second clutch is engaged with the second drive gear.

14. The series hybrid transmission as set forth in claim 13, wherein the controller controls movement of the first clutch and the second first clutch, while also controlling application of torque to the first shaft and the second shaft by the first motor device and the second motor device, respectively, from the preliminary configuration in which the second first clutch is engaged with the second first drive gear and the first clutch is engaged with the first drive gear to a second preliminary configuration in which the first clutch is engaged with the first drive gear and the second first clutch is disengaged from the second first drive gear.

15. The series hybrid transmission as set forth in claim 1, wherein the first motor device and the second motor device are both adapted to turn either clockwise or counter-clockwise.

16. A gear-shifting method in a series hybrid transmission, the series hybrid transmission comprising a first motor device for driving a first shaft, a second motor device for driving a second shaft, a first drive gear rotatably but not axially movably mounted on and the first shaft, a second drive gear rotatably but not axially movably mounted on the second shaft, a first clutch non-rotatably but axially movably mounted on the first shaft, the first clutch being movable to a first position in which it engages with the first drive gear to cause the first drive gear to rotate with the first shaft and to a second position in which it disengages with the first drive gear, a second clutch non-rotatably but axially movably mounted on the second shaft, the second clutch being movable to a first position in which it engages with the second drive gear to cause the second drive gear to rotate with the second shaft and to a second position in which it disengages with the second drive gear, and an output shaft comprising a first driven gear non-rotatably mounted on the output shaft and in engagement with the first drive gear and a second driven gear non-rotatably mounted on the output shaft and in engagement with the second drive gear, wherein the first driven gear and the first drive gear have a different gear ratio than the second driven gear and the second drive gear, the method comprising:
  controlling application of torque to the first shaft and the second shaft by the first motor device and the second motor device, respectively; and
  controlling movement of the first clutch and the second clutch, while also controlling application of torque to the first shaft and the second shaft by the first motor device and the second motor device, respectively, so that torque is applied to the first shaft and the second shaft by the first motor device and the second motor device, respectively, from a first configuration in which the first clutch is engaged with the first drive gear and the second clutch is engaged with the second drive gear to a second configuration in which the first clutch is disengaged from the first drive gear and the second clutch is engaged with the second drive gear.

17. The gear-shifting method in a series hybrid transmission as set forth in claim 16, comprising controlling application of torque to the first shaft and the second shaft by the first motor device and the second motor device, respectively, such that, when controlling movement of the first clutch and the second clutch from the first configuration to the second configuration, torque applied to the first shaft is reduced.

18. The gear-shifting method in a series hybrid transmission, as set forth in claim 16, wherein the series hybrid transmission further comprises a third drive gear rotatably but not axially movably mounted on the first shaft, a first shaft clutch non-rotatably but axially movably mounted on the first shaft, the first shaft clutch being movable to a first position in which it engages with the third drive gear to cause the third drive gear to rotate with the first shaft and to a second position in which it disengages with the third drive gear, and a third driven gear non-rotatably mounted on the output shaft and in engagement with the third drive gear, the method comprising:
  controlling movement of the first shaft clutch, while also controlling application of torque to the first shaft and the second shaft by the first motor device and the second motor device, respectively, from the second configuration in which the second clutch is engaged with the second drive gear and the first shaft clutch is disengaged with the third drive gear to a third configuration in which the second clutch is engaged with the second drive gear and the first shaft clutch is engaged with the third drive gear.

19. The gear-shifting method in a series hybrid transmission as set forth in claim 18, comprising controlling application of torque to the first shaft and the second shaft by the first motor device and the second motor device, respectively, such that, when controlling movement of the first shaft clutch and the second clutch from the second configuration to the third configuration, torque applied to the first shaft is increased.

20. The gear-shifting method in a series hybrid transmission as set forth in claim 18, comprising controlling movement of the second clutch, while also controlling application of torque to the first shaft and the second shaft by the first motor device and the second motor device, respectively, from the third configuration in which the second clutch is engaged with the second drive gear and the first shaft clutch is engaged with the third drive gear to a fourth configuration in which the second clutch is disengaged with the second drive gear and the first shaft clutch is engaged with the third drive gear.

21. The gear-shifting method in a series hybrid transmission as set forth in claim 16, the series hybrid transmission comprising a second first drive gear rotatably but not axially movably mounted on the second shaft, a second first clutch non-rotatably but axially movably mounted on the second shaft, the second first clutch being movable to a first position in which it engages with the second first drive gear to cause the second first drive gear to rotate with the second shaft and to a second position in which it disengages with the second first drive gear, the method comprising:

controlling movement of the first clutch and the second first clutch, while also controlling application of torque to the first shaft and the second shaft by the first motor device and the second motor device, respectively, from a preliminary configuration in which the second first clutch is engaged with the second first drive gear and the first clutch is engaged with the first drive gear to the first configuration the first clutch is engaged with the first drive gear and the second clutch is engaged with the second drive gear.

22. The gear-shifting method in a series hybrid transmission as set forth in claim 21, comprising controlling movement of the first clutch and the second first clutch, while also controlling application of torque to the first shaft and the second shaft by the first motor device and the second motor device, respectively, from the preliminary configuration in which the second first clutch is engaged with the second first drive gear and the first clutch is engaged with the first drive gear to a second preliminary configuration in which the first clutch is engaged with the first drive gear and the second first clutch is disengaged from the second first drive gear.

23. The gear-shifting method in a series hybrid transmission as set forth in claim 16, comprising changing direction of turning of the first and second motor devices so that the output shaft changes direction of turning from clockwise to counter-clockwise.

24. A series hybrid transmission, comprising:
a first motor device for driving a first shaft;
a second motor device for driving a second shaft;
a first drive gear rotatably but not axially movably mounted on and the first shaft;
a second drive gear rotatably but not axially movably mounted on the second shaft;
a first clutch non-rotatably but axially movably mounted on the first shaft, the first clutch being movable to a first position in which it engages with the first drive gear to cause the first drive gear to rotate with the first shaft and to a second position in which it disengages with the first drive gear;
a second clutch non-rotatably but axially movably mounted on the second shaft, the second clutch being movable to a first position in which it engages with the second drive gear to cause the second drive gear to rotate with the second shaft and to a second position in which it disengages with the second drive gear;
an output shaft comprising a first driven gear non-rotatably mounted on the output shaft and in engagement with the first drive gear and a second driven gear non-rotatably mounted on the output shaft and in engagement with the second drive gear, and
a controller for controlling movement of the first clutch and the second clutch, while also controlling application of torque to the first shaft and the second shaft by the first motor device and the second motor device, respectively, so that torque is applied to the first shaft and the second shaft by the first motor device and the second motor device, respectively, both in a first, configuration in which the first clutch is engaged with the first drive gear and the second clutch is engaged with the second drive gear and in a second configuration in which the first clutch is disengaged from the first drive gear and the second clutch is engaged with the second drive gear.

* * * * *